METHOD FOR PRODUCING CRYSTALLINE COMPLEX PEROVSKITE COMPOUNDS

BACKGROUND OF THE INVENTION

1. Field of the Invention

This invention relates to crystalline complex perovskite compounds which are useful as a material for capacitors or other ceramic materials and more particularly, to a method for producing such complex perovskite compounds.

2. Description of the Prior Art

For the manufacture of oxide ceramic powders, usual practice is to mix metal oxides, carbonates and the like in a suitable milling device such as a ball mill and calcine the mixture at suitable temperatures. The resultant powder is, however, disadvantageous in that it is large and irregular in size, so that sinterability is not good; because of the non-uniformity of the composition, the characteristics of the powder are not consistent; and since the ingredients are mechanically mixed and milled, for example, by a bal mill, incorporation of impurities is inevitable.

In order to avoid the above disadvantages, various preparation processes using starting powders have been proposed. One such process is a process of hydrolyzing metal alkoxides. This process makes use of the reaction between a metal alkoxide of the formula, $M(OR)n$, in which M is a metal atom having a balance of n, and R represents an alkyl group, and water thereby forming a metal oxide or hydroxide and an alcohol. For instance, $BaTiO_3$ having a perovskite structure can be prepared by dissolving barium alkoxide and titanium alkoxide at a molar ratio of 1:1 in an organic solvent and dropping the solution into water for hydrolysis. This is described, for example, in Japanese Laid-open patent application No. 57-82119. The powder obtained by the above process has been already crystallized at a low powder formation temperature of 70° to 80° C. Further, the powder has a fine size and good sinterability, and is substantially free of any impurities as will occur at the time of mixing in a ball mill.

Oxides which contain two or more metals and can be prepared as a crystalline powder by similar processes as described above include, for example, perovskite compounds or solid solutions thereof such as $SrTiO_3$, $Ba(Ti_{1-x}Zr_x)O_3$, $BaZrO_3$, $(Ba_{1-x}Sr_x)TiO_3$ and the like as described in Japanese Laid-open patent application No. 58-2220; ferrite compounds such as $MnFe_2O_4$, $(Mn_{1-x}Zn_x)Fe_2O_4$, $NiFe_2O_4$ and the like as described in Japanese Laid-open Patent Application No. 56-26726; germanic acid salts such as $SrGeO_3$, $PbGeO_3$, $ZnGeO_3$ and the like as described in Japanese Laid-open patent application No. 58-199717; and other oxides such as $PbWO_4$, $SrAs_2O_6$ and the like.

However, the hydrolysis processes of metal alkoxides have a serious problem that starting metal alkoxides are very expensive.

Other processes have also been proposed to obtain a fine powder by reaction of two or more metal salts or hydrolyzates in a strongly alkaline aqueous solution. These processes are useful in preparation of crystalline powders of simple perovskite compounds or solid solutions thereof including, for example, $BaTiO_3$ (Journal of the Industrial Chemistry, Vol. 71, No. 1 and Japanese Laid-open patent application No. 59-39716), $Ba(Ti_{1-x}Zr_x)O_3$ and $(Ba_{1-x}Sr_x)TiO_3$ (Japanese Laid-open patent application No. 60-10303), and $PbTiO_3$ (Japanese Laid-open patent application No. 61-158821).

For the preparation of complex perovskite compounds having a more complicated crystalline structure and represented, for example, by the following formula, $$A(B_x, C_y)O_3$$

in which A, B and C are, respectively, metal atoms having valences of p, q and r, and $x+y=1$ provided that $q \neq r$ and $xq+yr=6-p$, the above-described known processes or techniques are not satisfactory. For instance, with the hdyrolysis method of metal alkoxides, an amorphous powder is formed. According to the process using a metal salt or its hydrolyzate, only four compounds indicated above are now prepared, but crystalline complex perovskite compounds have not been produced by the latter process. Even though the individual compounds of the solid solutions are taken into account, only four types of compounds including $BaTiO_3$, $BaZrO_3$, $SrTiO_3$ and $PbTiO_3$ are prepared.

SUMMARY OF THE INVENTION

It is therefore an object of the invention to provide a method for producing crystalline complex perovskite compounds in the form of a fine powder by a simple and inexpensive manner.

It is another object of the invention to provide a method for producing crystalline complex perovskite compounds in which the perovskite compounds are obtained at low reaction temperatures.

The above objects can be achieved, according to the invention, by a method of producing a crystalline complex perovskite compound of the formula, $A(B_{\frac{1}{3}}C_{\frac{2}{3}})O_3$, in which A represents at least one divalent metal selected from the group consisting of Ca, Sr and Ba, B represents at least one divalent metal selected from the group consisting of Mg, Zn, Co and Ni, and C represents at least one pentavalent metal selected from the group consisting of Nb and Ta. The method comprises providing at predetermined mixing ratios at least one compound of the metal A, at least one compound of the metal B and at least one compound of the metal C, the these compounds of the metals A, B and C being selected from the group consisting of oxides, hydroxides, hydrous oxides, water-soluble inorganic salts and organic compounds of the metals A, B and C, respectively, provided that the water-soluble inorganic salts and organic compounds of the metals are, respectively, capable of yielding oxides, hydroxide and hydrous oxides of the metals by hydrolysis, and reacting or treating the mixture in an alkaline aqueous solution at a temperature sufficient to cause the mixture to convert into a crystalline complex perovskite compound. The present invention is characterized by the treatment of the starting compounds in an alkaline aqueous solution at certain, relatively low temperatures.

Preferably, the hydroxides, oxides or hydrous oxides obtained by hydrolysis of water-soluble metal salts or organic metal compounds are used because these compounds are more reactive and are likely to be formed as finer powders. When starting compounds of the respective metals are provided and are subsequently reacted in an alkaline aqueous solution, a uniformly mixed amorphous material is initially formed. This amorphous material or mixture is then converted into a crystalline complex perovskite compound when heated at 95° C. or over. Accordingly, it is possible to form the perovskite

United States Patent [19]

Inoue et al.

[11] Patent Number: 4,853,199

[45] Date of Patent: Aug. 1, 1989

[54] METHOD FOR PRODUCING CRYSTALLINE COMPLEX PEROVSKITE COMPOUNDS

[75] Inventors: Osamu Inoue; Syunichiro Kawashima, both of Osaka, Japan

[73] Assignee: Matsushita Electric Industrial Co., Ltd., Japan

[21] Appl. No.: 141,774

[22] Filed: Jan. 7, 1988

[30] Foreign Application Priority Data

Jan. 8, 1987 [JP] Japan .................................. 62-2375
Mar. 5, 1987 [JP] Japan ................................. 62-50558
Sep. 29, 1987 [JP] Japan ............................... 62-245121

[51] Int. Cl.$^4$ ...................... C01G 33/00; C01G 35/00
[52] U.S. Cl. .................................... 423/594; 423/593; 501/135
[58] Field of Search .............. 423/593, 598, 592, 594; 252/62.9; 501/134, 135

[56] References Cited

U.S. PATENT DOCUMENTS

| | | | |
|---|---|---|---|
| 3,464,785 | 9/1969 | Galasso | 423/598 |
| 4,487,842 | 12/1984 | Nomura et al. | 501/135 |
| 4,675,123 | 6/1987 | Tsunooka et al. | 252/62.9 |

FOREIGN PATENT DOCUMENTS

| | | | |
|---|---|---|---|
| 55-56063 | 4/1980 | Japan | 252/62.9 |
| 56-26726 | 3/1981 | Japan . | |
| 57-82119 | 5/1982 | Japan . | |
| 58-2220 | 1/1983 | Japan . | |
| 58-199717 | 11/1983 | Japan . | |
| 59-39716 | 3/1984 | Japan . | |
| 60-10303 | 1/1985 | Japan . | |
| 61-158821 | 7/1986 | Japan . | |

OTHER PUBLICATIONS

Galasso et al, "Ordering in Compounds of the A(B'$_{0.3}$-3Ta$_{0.67}$)O$_3$ Type", Inorganic Chemistry, p. 482–484.

*Primary Examiner*—Jack Cooper
*Attorney, Agent, or Firm*—Lowe, Price, Leblanc, Becker & Shur

[57] ABSTRACT

A method for producing crystalline complex perovskite compounds from starting compounds of at least one metal such as Ca, Ba or Sr, at least one metal such as Mg, Zn, Ni or Co and at least one metal such as Ta or Ni. The respective compounds are selected from oxides, hydroxides, hydrous oxides, and water-soluble organic compounds and inorganic salts of the respective metals. The water-soluble organic compounds and inorganic salts are capable of yielding metal oxides, hydroxides and hydrous oxides by hydrolysis. These starting compounds are heated at certain temperatures in an alkaline aqueous solution to obtain the perovskite compound at significantly low reaction temperatures of at least 95° C. Prior to the heating, the starting compounds may be treated in the alkaline aqueous solution at temperatures lower than 95° C. to form a uniformly mixed amorphous phase of the compounds and then heated.

19 Claims, No Drawings alkaline substances such as NaOH may be added to the reaction system but, as described before, the contamination of the final product with Na would become inevitable. Accordingly, it is preferred to use an aqueous saturated solution of a starting alkaline compound as an alkaline aqueous solution, or to permit part of a starting alkaline compound to be dissolved in water and continue the reaction until the water is gradually evaporated to dryness.

The conversion reaction is considered to proceed by two steps: one step includes interaction of three kinds of starting materials in an alkaline aqueous solution to form a uniformly mixed amorphous powder mixture; and the other step includes crystallization of the amorphous powder by heating at temperatures not lower than 95° C. in the solution to form a crystalline complex perovskite compound.

The first step proceeds more fastly at higher temperatures, but the temperature is not critical. The temperature higher than 70° C. is preferable in order to cause the interaction efficiently. The time before completion of the interaction may vary depending upon not only the interaction temperature, but also the types and amounts of starting materials. The intereaction time may be in a wide range of 0.5 hours or 100 hours, preferably several to several tens hours. The uniformly mixed amorphous phase obtained by the interaction is considered to be a kind of precursor in which metal—O—metal bonds may be formed along with metal—OH bonds.

In the crystallization step, the temperature is important. When the interaction has been completed and the resultant amorphous powder is heated under contact with the alkaline solution at a certain temperature, the crystallization proceeds. A crystalline complex perovskite compound starts to be formed at temperatures of 95° C. or higher as will be clearly seen from the examples. The heating temperature is preferably not lower than 100° C., more preferably not lower than 105° C. for ensuring a smooth crystallization procedure. At temperatures higher than 100° C., the crystallization is generally effected in a closed system, such as an autoclave, under pressure because the reaction system is aqueous.

In one embodiment of the invention which comprises one step reaction procedure as described before, the reaction system is heated to 95° C. or higher from commencement of the treatment in coexistence of or in an alkaline aqueous solution so that the starting materials are converted through an amorphous powder into crystallized by one step. This one step procedure is preferably effected in an autoclave or the like closed system so that temperatures of 95° C. or higher are conveniently used.

In another embodiment of the invention, the interaction is effected at temperatures lower than 95° C. for a sufficient time of 0.5 hours or longer in an aqueous alkaline solution to obtain a uniformly mixed amorphous powder. Preferably, the temperature is 70° C. or higher. Subsequently, this powder is heated at 95° C. or higher in coexistence of or in the alkaline solution. This embodiment is different from the first embodiment in that the amorphous powder is initially formed by treatment in the alkaline aqueous solution at temperatures lower than 95° C., at which crystallization starts to occur, and is then crystallized at temperatures higher than 95° C. as set forth with respect to the first embodiment. For the crystallization, the thus obtained amorphous powder may be removed from the solution but fully wetted therewith and heated at temperatures not lower than 95° C. Alternatively, the amorphous powder in the aqueous alkaline solution may be heated at it is at temperatures not lower than 95° C. for a time sufficient for crystallization, or may be heated until the mixture is evaporated to dryness if at least one of the starting materials is soluble in water and is used to make an alkaline solution. This embodiment using the distinct two interaction and crystallization steps is advantageous in that crystals of a final perovskite compound are finer and more uniform in size.

In either embodiment, the conversion reaction is preferably effected in an atmosphere of a gas free of $CO_2$ so that formation of a crystalline complex perovskite compound is not impeded at all. This is because if Ba is contained, for example, in the starting materials, it may react with $CO_2$ and convert into barium carbonate, which is insoluble in water. Accordingly, it is preferred to effect the reaction in an atmosphere of a $CO_2$-free gas such as $N_2$ or $O_2$, or other inert gases such as Ar.

The conversion reaction takes a relatively long time, so that the reaction should preferably be effected in a closed or substantially closed system, not permitting the water in the reaction system to be evaporated by heating. For this purpose, a system using a reflux condenser as well as an autoclave may be conveniently used to recycle once evaporated water. In this connection, it should be noted that if starting alkaline materials are used to make an alkaline reaction system without use of any additional alkaline substances, the water in the system may be purposely evaporated off by heating so as to bring a final composition of the perovskite to conform to an initially intended composition. The treatment or reaction may be carried out under agitation or merely under reflux.

The final perovskite product is usually obtained in an alkaline solution. The product may be separated from the solution by any known techniques such as filtration, centrifugal separation and the like.

Typical and preferable examples of final crystalline complex perovskite compounds prepared according to the method of the invention include $Ba(Zn_{\frac{1}{3}}Ta_{\frac{2}{3}})O_3$, $Ba(Mg_{\frac{1}{3}}Ta_{\frac{2}{3}})O_3$, $Sr(Mg_{\frac{1}{3}}Nb_{\frac{2}{3}})O_3$ and the like.

The present invention is more particularly described by way of examples.

EXAMPLE 1

Prior to preparation of a complex perovskite compound, starting compounds were first prepared. Special grade $ZnSO_4$ was dissolved in pure water, to which NaOH was added in order to make a pH of approximately 6.5. The resultant precipitate was separated from the solution and washed sufficiently with pure water to obtain zinc hydroxide. Separately, $TaCl_5$ was dissolved in a mixture of nitric acid and hydrofluoric acid and neutralized in the same manner as with Zn to obtain an amorphous hydrolyzate of tantalum. The thus obtained powders were each heated up to 1000° C. to determine an ignition loss, from which the contents of Zn and Ta were, respectively, determined. These powders and special grade $Ba(OH)_2 \cdot 8H_2O$ were accurately weighed in such amounts that Ba:Zn:Ta=3:1:2 by atomic ratio. The powders were mixed with an aqueous saturated solution of barium hydroxide in a flask. The flask was set on a water bath and heated under reflux in a stream of $N_2$ gas at 80° C. for 5 hours. The resultant precipitate was separated by a centrifugal separator, and divided into pieces. The respective pieces were wrapped with paper in a wet condition and dried at different temperatures of 30° C., 90° C., 95° C., 100° C. and 110° C. to obtain the respective powder products. These products were each subjected to X-ray diffraction. As a result, it was found that the sample dried at 30° C. consisted of an amorphous phase and barium hydroxide. The sample dried at 90° C. was entirely amorphous. Those samples dried at 95° C. and 100° C. showed peaks of a crystalline complex perovskite phase of $Ba(Zn_{\frac{1}{3}}Ta_{\frac{2}{3}})O_3$ although these peaks were broad. The sample dried at 110° C. was found to be crystalline $Ba(Zn_{\frac{1}{3}}Ta_{\frac{2}{3}})O_3$.

EXAMPLE 2

In the same manner as in Example 1, $Ba(OH)_2.8H_2O$, and amorphous hydrolyzate product of tantalum and ZnO obtained by precipitation from an aqueous solution of $ZnSO_4$ at a pH of 10 were provided in such amounts that Ba:Zn:Ta=3:1:2 by atomic ratio. These powders were added to 50 ml of pure water and heated under reflux in an stream of $N_2$ at 90° C. for 5 hours. Thereafter, a reflux condenser was removed and the temperature was raised to 100° C., at which the content was heated under agitation until it was evaporated to dryness. The resultant powder was subjected to measurement of X-ray diffraction, revealing a very broad diffraction peak of a crystalline complex perovskite phase of $Ba(Zn_{\frac{1}{3}}Ta_{\frac{2}{3}})O_3$. Example 3

$Ta(C_2H_5O)_5$ was dissolved in ethanol, to which pure water was added thereby obtaining an amorphous hydrolyzate product of tantalum. This tantalum product, $BaSO_4$ and $ZnSO_4$ were provided in such amounts that Ba:Zn:Ta=3:1:2 by atomic ratio, followed by addition to 100 ml of pure water. Thereafter, an aqueous NaOH solution was added to the mixture in an amount of 0.032 moles as NaOH, followed by heating under reflux in a stream of $N_2$ at the boiling point for 5 hours.

The resultant powder was dried and subjected to X-ray diffraction, from which it was confirmed that a crystalline complex perovskite compound, $Ba(Zn_{\frac{1}{3}}Ta_{\frac{2}{3}})O_3$, was formed although the peak was very broad.

EXAMPLE 4

Similar to Example 2, $Ba(OH)_2.8H_2O$, an amorphous tantalum hydrolyzate and ZnO obtained by precipitation from an aqueous solution of $ZnSo_4$ at a pH of 10 were, respectively, provided in such amounts that that Ba:Zn:Ta=3:1:2 by atomic ratio. These powders were added to 50 ml of an aqueous saturated solution of barium hydroxide. The dispersion was placed in a 200 ml autoclave and subjected to reaction at 120° C. for 5 hours. Thereafter, the content was cooled down to room temperature and the resultant powder was separated by filtration and dried. This powder was subjected to X-ray diffraction analysis, from which it was confirmed that a crystalline complex perovskite compound was formed. The formed crystals had a size of about 0.1 micrometer.

EXAMPLE 5

Similar to Example 1, $Ba(OH)_2.8H_2O$, an amorphous hyrolyzate of tantalum oxide and MgO were, respectively, provided in such amounts that Ba:Mg:Ta=3:1:2 by atomic ratio. These powders were added to 150 ml of an aqueous saturated solution of barium hydroxide and magnesium hydroxide and placed in a flask. The above procedure was repeated, thereby giving three flasks in total. These flasks were, respectively, set on a water bath and heated under reflux in a stream of $N_2$ at 80° C., 90° C. and 95° C. for 5 hours. The resultant precipitate was separated by means of a centrifugal separator, transferred to a beaker and dried in a dryer at 80° C. The powders obtained under different conditions were subjected to X-ray diffraction analysis. As a result, it was found that the powders treated at 80° C. and 90° C. were amorphous. On the other hand, the powder treated or reacted at 95° C. showed a diffraction peak of a crystalline complex perovskite phase of $Ba(Mg_{\frac{1}{3}}Ta_{\frac{2}{3}})O_3$ although the peak was very broad.

EXAMPLE 6

Similar to Example 6, $Ba(OH)_2.8H_2O$, MgO and an amorphous hydrolyzate of tantalum were, respectively, provided in such amounts that Ba:Mg:Ta=3:1:2 by atomic ratio. These powders were added to 50 ml of pure water and placed in a 200 ml autoclave, followed by treatment at 110° C. for 5 hours. Thereafter, the content in the autoclave was transferred to a teflon beaker and dried at 100° C. The resultant powder was subjected to X-ray diffraction analysis, revealing that a crystalline complex perovskite phase of $Ba(Mg_{\frac{1}{3}}Ta_{\frac{2}{3}})O_3$ was formed. The size of the powder determined from the X-ray diffraction analysis was about 0.1 micrometer.

EXAMPLE 7

$Ta(C_2H_5O)_5$ was dissolved in ethanol, to which pure water was added thereby obtaining an hydrolyzate product of tantalum. This tantalum product, $BaSO_4$ and $MgSO_4$ were, respectively, provided in such amounts that Ba:Mg:Ta=3:1:2 by atomic ratio. These powders were added to 100 ml of pure water, to which an aqueous NaOH solution was added in such an amount that the content of NaOH was 0.032 moles. The mixture was reacted by heating in a stream of $N_2$ under reflux at the boiling point of about 100° C. for 5 hours. Subsequently, the content was cooled down to room temperature and the resultant powder was filtered off and dried. The dried powder was subjected to X-ray diffraction analysis, from which formation of a crystalline complex perovskite compound was confirmed. The crystals of the powder had a size of about 0.2 micrometers.

EXAMPLE 9

A precipitate obtained by neutralizing an acidic aqueous solution of $NbCl_5$ was washed sufficiently with pure water and dried to obtain an amorphous hydrolyzate product of niobium. This niobium product, special grade strontium hydroxide and magnetic oxide were, respectively, provided in such amounts that Sr:Mg:Nb=3:1:2 by atomic ratio. These materials were added to 150 ml of an aqueous saturated solution of strontium hydroxide and magnesium hydroxide and placed in an autoclave. The above procedure was repeated to obtain six samples in total. These samples were reacted for 2 hours at different temperatures of 80° C., 90° C., 95° C., 100° C., 110° C. and 140° C. The resultant reaction products were each separated by filtration, washed with water and dried at 80° C. Each product was subjected to X-ray diffraction analysis. As a result, it was found that the products obtained by the reaction at 80° C. and 90° C. were amorphous. The products obtained by the reaction at 95° C. and 100° C. were observed to have broad diffraction peaks of crystalline $Sr(Mg_{\frac{1}{3}}Nb_{\frac{2}{3}})O_3$. The products obtained by the reaction at 110° C. and 140° C. were crystalline $Sr(Mg_{\frac{1}{3}}Nb_{\frac{2}{3}})O_3$.

EXAMPLE 10

Similar to Example 9, an amorphous hydrolyzate product of niobium, special grade strontium hydroxide and magnesium oxide were, respectively, provided in such amounts that that Sr:Mg:Nb=3:1:2 by atomic ratio. These materials were added to 50 ml of pure water and reacted by heating under reflux in a stream of Ar at 90° C. for 3 hours.

Thereafter, a reflux condenser was removed and the temperature of the reaction system was raised to about 100° C., followed by heating until the water was completely evaporated. The resultant powder was subjected to X-ray diffraction analysis, with the results that a broad diffraction peak of $Sr(Mg_{\frac{1}{3}}Nb_{\frac{2}{3}})O_3$ was observed.

EXAMPLE 11

Niobium ethoxide, special grade strontium sulfate and magnetic hydroxide were, respectively, provided in such amounts that Sr:Mg:Nb=3:1:2 by atomic ratio. These materials were added to 200 ml of an aqueous NaOH solution having a concentration of 1 mole and reacted in an autoclave in a stream of Ar at 110° C. for 5 hours. The resultant powder was subjected to X-ray diffraction analysis, from which a diffraction peak of crystalline $Sr(Mg_{\frac{1}{3}}Nb_{\frac{2}{3}})O_3$ was observed. The crystals of the powder had a size of about 0.1 micrometer.

What is claimed is:

1. A method of producing a fine powder, crystalline complex perovskite compound of the formula

wherein
- A represents at least one divalent metal selected from the group consisting of Ca, Sr and Ba,
- B represents at least one metal selected from the group consisting of Mg, Zn, Co and Ni, and
- C represents at least one pentavalent metal selected from the group consisting of Ta and Nb, the method comprising
    providing a proportion of at least one member selected from the group consisting of oxides, hydroxides, hydrous oxides, water-soluble inorganic salts and organic compounds of the metals A, at least one member selected from the group consisting of oxides, hydroxides, hydrous oxides, water-soluble inorganic salts and organic compounds of the metals B, and at least one member selected from the group consisting of oxides, hydroxides, hydrous oxides, water-soluble inorganic salts and organic compounds of the metals C, provided that the watersoluble inorganic salts and organic compounds of the respective metals are, respectively, capable of yielding oxides, hydroxide and hydrous oxides of the metals by hydrolysis, said member which are not water soluble having a size of one micrometer or less, the proportion of said members being such as to effect formation of said perovskite compound; and
    reacting the selected members in an alkaline aqueous solution at a temperature of 140° C. or lower, said temperature being sufficient to cause the members to convert into the fine powder, crystalline complex perovskite compound.

2. A method according to claim 1, wherein said crystalline complex perovskite compound is $Sr(Mg_{\frac{1}{3}}Nb_{\frac{2}{3}})O_3$.

3. A method according to claim 1, wherein said crystalline complex perovskite compound is $Ba(Mg_{\frac{1}{3}}Ta_{\frac{2}{3}})O_3$.

4. A method according to claim 1, wherein said crystalline complex perovskite compound is $Ba(Zn_{\frac{1}{3}}Ta_{\frac{2}{3}})O_3$.

5. A method according to claim 1, wherein said alkaline aqueous solution is a solution of a hydroxide of the metal A.

6. A method according to claim 5, wherein the solution of a hydroxide of the metal A is a saturated solution.

7. A method according to claim 1, wherein said alkaline aqueous solution is a solution of an alkali metal hydroxide.

8. A method according to claim 1, wherein said alkaline aqueous solution has a pH not lower than 12.

9. A method according to claim 1, wherein the temperature is higher than 95° C.

10. A method according to claim 1, wherein the temperature is higher than 110° C. and the reaction is effected in a closed system under pressure.

11. A method according to claim 1, wherein the reaction is effected in a system using a reflux condenser so that the water in the alkaline aqueous solution is recycled.

12. A method according to claim 1, further comprising heating the alkaline aqueous solution to dryness when at least one of the selected members is soluble in water and is used to make the alkaline aqueous solution.

13. A method according to claim 1, further comprising separating the obtained perovskite compound from the alkaline aqueous solution.

14. A method according got claim 1, wherein the reaction is effected in a $CO_2$ gas-free atmosphere.

15. A method according to claim 1, wherein the reaction is effected by a procedure which comprises treating the selected members in an alkaline aqueous solution at a temperature lower than 95° C. to form a uniformly mixed amorphous powder, and heating the amorphous powder in the alkaline aqueous solution or in coexistence therewith at a temperature not lower than 95° C. to convert the powder into a crystalline complex perovskite compound.

16. A method according to claim 15, wherein the amorphous powder is heated at a temperature higher than 110° C.

17. A method according to claim 15, wherein prior to the heating, the amorphous powder is removed from the solution but kept wetted, and is subsequently heated.

18. A method according to claim 15, wherein the amorphous powder is heated in the alkaline aqueous solution.

19. A method according to claim 15, wherein the amorphous powder is heated to dryness.

* * * * *